United States Patent [19]

Baum

[11] Patent Number: 5,139,838

[45] Date of Patent: Aug. 18, 1992

[54] SHOCK ABSORBENT STRUCTURE FOR CARRYING CASES

[76] Inventor: Russell C. Baum, c/o Innovative Mfg. Corp., 3730 N.W. 82nd St., Miami, Fla. 33147

[21] Appl. No.: 555,304

[22] Filed: Jul. 20, 1990

[51] Int. Cl.⁵ .............................................. B32B 3/00
[52] U.S. Cl. ........................................ 428/72; 428/71; 428/76; 428/178; 428/182; 428/188
[58] Field of Search .................... 428/188, 182, 76, 72, 428/68, 71, 178, 192, 304.4

[56] References Cited

U.S. PATENT DOCUMENTS

| | | | |
|---|---|---|---|
| 4,119,750 | 10/1978 | Porter | 428/72 |
| 4,131,702 | 12/1978 | Alfter | 428/76 |
| 4,262,050 | 4/1981 | Jenkins | 428/182 |
| 4,313,993 | 2/1982 | McGlory | 428/178 |

*Primary Examiner*—Ellis P. Robinson
*Assistant Examiner*—Donald J. Loney
*Attorney, Agent, or Firm*—Malloy, Downey & Malloy

[57] ABSTRACT

A shock absorbent structure for use in the wall construction of carrying cases to prevent damage to the contents within a carrying case from shock impacts. The shock absorbent structure includes a central impact shield formed of a rigid, impact resistant thermoplastic material having an interior corrugated core extending between and connecting to opposite upper and lower layers. The impact shield is sandwiched between a pair of impact pads formed of a high impact foam material adapted to absorb a substantial shock impact exerted thereon. The foam impact pads with the impact shield sandwiched therebetween are adapted to be fitted within the wall construction of a carrying case between the outer shell and inner lining whereby a shock delivered to the outer shell of the carrying case will be substantially absorbed by the impact pad with any excessive shock being elastically dispersed throughout the interior core of the impact shield in a direction substantially parallel to the wall of the carrying case.

6 Claims, 1 Drawing Sheet

SHOCK ABSORBENT STRUCTURE FOR CARRYING CASES

BACKGROUND OF THE INVENTION

1. Field of the Invention

A shock absorbent structure for use in the wall construction of carrying cases to protect the contents within a carrying case from damage to a shock impact delivered to the exterior of the carrying case.

2. Description of the Prior Art

There is an ever increasing demand for the need for portability of computer related components and other electronic devices to accommodate transport between various locations where these components or devices are desired to be used. Specifically, many business people find the need to transport computer components between their home and office on a daily basis. Accordingly, many components such as lap top computers, fax machines, printers, typewriters, and other related components are being made to be more portable in an effort to satisfy the existing needs of many computer users.

To further assist the carrying and transport of these various computer related components as well as other electronic devices, many carrying cases have been designed to carry one and, in some cases, several components in separate compartments. These carrying cases generally include an outer shell and an inner lining and may include some type of padding or stuffing between the outer shell and inner lining to provide some protection to the contents within the case. However, because most computer components such as hard drives, printers and display screens are somewhat delicate, a substantial shock impact exerted on the carrying case could cause severe damage to the hardware of these components resulting in expensive repair or replacement costs. It has been found that the padding or stuffing material normally found in some of the carrying cases in the prior art is inadequate to protect the equipment contained therein from an excessive shock impact exerted on the exterior walls of the carrying case such as is normally encountered during every day travel.

Accordingly, there is a need in the computer industry as well as other electronic component industries for a shock absorbent structure and more specifically, a shock barrier construction formed within the wall construction of computer and electronic component carrying cases which is specifically adapted to absorb and redirect shock impacts exerted thereon, thereby preventing damage and making transport of computers and other sensitive equipment safer and more practical.

SUMMARY OF THE INVENTION

The present invention is directed to a shock absorbent structure adapted to be used in the wall construction of electronic component carrying cases such as those used for carrying computer related components, such as lap tops, printers, keyboards, fax machines and the like. The shock barrier structure is adapted to be built within the walls of the carrying case between the outer shell and the inner lining thereby forming a shock barrier between the exterior of the case and the interior carrying compartment. The shock absorbent structure is specifically adapted to substantially absorb shock impacts and redirect any excessive impact in a direction substantially parallel to the wall construction away from the interior compartment and contents therein so that shock damage is prevented.

The shock absorbent structure includes a centrally disposed impact shield formed of a substantially rigid, impact resistant thermoplastic material which includes an interior core fitted between two oppositely disposed, spaced apart layers. The interior core is generally of a corrugated or honeycomb configuration forming a plurality of longitudinally extending segments connecting between the upper and lower layers and forming hollow channels therebetween.

The shock impact shield is structured to be sandwiched between two impact pads placed on opposite sides of the impact shield in confronting, covering relation to the outer surfaces of the upper and lower layers. The impact pads are preferably formed of a high impact foam material as commonly used in football and motorcycle helmets. This type of high impact foam material is not only resilient, but is specifically adapted for the absorption of shock impact.

The sandwiched construction of the impact shield between the opposite impact pads is designed to be fitted between the inner lining and exterior shell of the carrying case thereby forming a shock barrier therebetween. Additionally, the impact shield, being formed of a thermoplastic material, is specifically adapted to prevent the transfer of heat between the case interior and exterior thereby forming an effective insulator against heat and cold and protecting the equipment stored within the case from damage due to temperature extremes.

In use, a direct impact delivered to the exterior of the carrying case would be substantially absorbed by the outermost impact pad. Any excessive shock, not absorbed by the impact pad, would be delivered to the impact shield where it would be dispersed and redirected by the interior core construction in a direction substantially parallel to the wall construction, thereby eliminating shock damage to the contents within the carrying case.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Figure 1:
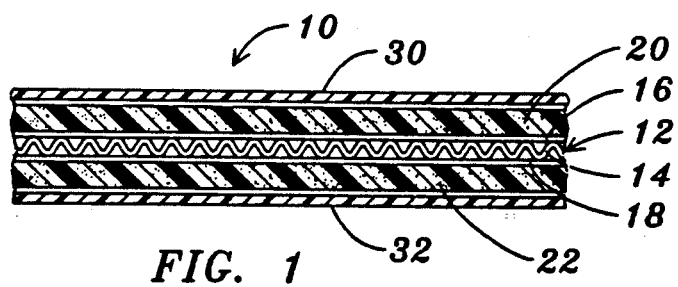
FIG. 1 is a side plan view taken in section illustrating the shock absorbent structure within the wall construction of a carrying case.

As seen in FIG. 1, the present invention is directed towards a shock absorbent structure generally indicated as 10 adapted to be used in the sidewall construction of carrying cases, and particularly, computer component and other electronic component type carrying cases.

The shock absorbent structure includes a centrally disposed impact shield generally indicated as 12 and including an interior core 14 structured and disposed in connecting relation between oppositely disposed, spaced apart layers including an upper layer 16 and a lower layer 18. In the preferred embodiment, the impact shield 12, including the core 14 and upper and lower layers 16, 18 are formed of a rigid, thermoplastic material adapted to resist shock impact while at the same time, prevent the transfer of heat therethrough, thereby forming an effective insulator to protect against excessive heat or cold.

In the construction of the shock absorbent structure 10, the impact shield 12 is sandwiched between two high impact pads including an outer pad 20 and an inner pad 22 disposed on opposite sides of the impact shield in confronting, substantially covering relation to the outer surfaces of the upper 16 and lower 18 layers, respectively. This sandwiched structure comprising the impact pads 20 and 22 and the centrally disposed impact shield 12 is adapted to be fitted between the outer shell material 30 and inner lining 32 of the carrying case.

Figure 2:
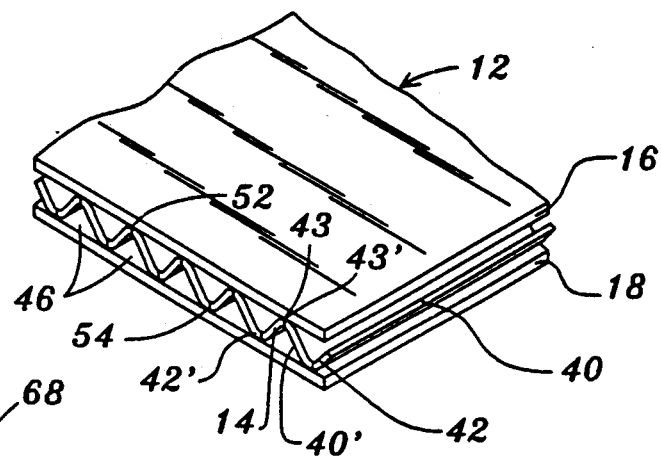
FIG. 2 is a perspective view of the shock impact shield.

With reference to FIG. 2, the impact shield 12 is seen wherein the upper and lower layers 16 and 18 comprise a substantially planar sheet like configuration formed of rigid, thermoplastic material being spaced apart in parallel relation and having the interior core fitted therebetween. In the preferred embodiment, the interior core is generally of a corrugated configuration and includes a plurality of elongate segments such as 40 and 40' extending longitudinally along their lengths between the upper 16 and lower 18 layers and connecting thereto along opposite side edges 42, 43 and 42', 43'. Extending longitudinally between the segments 40 and 40' there are a plurality of hollow channels 46 which are adapted to absorb impact between the upper 16 and lower 18 layers. The plurality of segments of the interior core are preferably arranged to extend at an angle between the upper and lower layers 16 and 18 meeting with an adjacent segment along a common side edge as at 43, 43' to form upper and lower apexes as at 52 and 54, respectively. However, the segments 40, 40' may also be arranged so as to extend between the upper and lower lawyers in a substantially upright parallel orientation. The upper layer 16 is connected to the longitudinally upper apexes 52 and the lower layer 18 is accordingly connected to the lower longitudinally extending apexes 54. This angular construction of the segments within the interior core is designed to reflect and redirect shock impact in a direction substantially parallel to the plane of the upper 16 and lower 18 layers.

Figure 3:
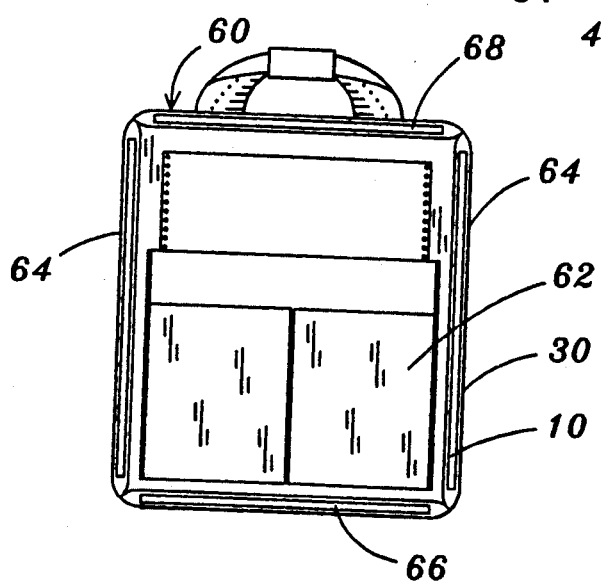
FIG. 3 is a side plan view taken in partial section illustrating the sidewall construction of a carrying case.

In a preferred embodiment, the shock absorbent structure would be fitted within the surrounding wall structure of a carrying case 60 as shown in FIG. 3. In this manner, the case interior 62 is protected around all sides from shock impact which may be exerted to either sidewalls 64, the base 66, or the top portion 68 of the case 60.

Figure 4:
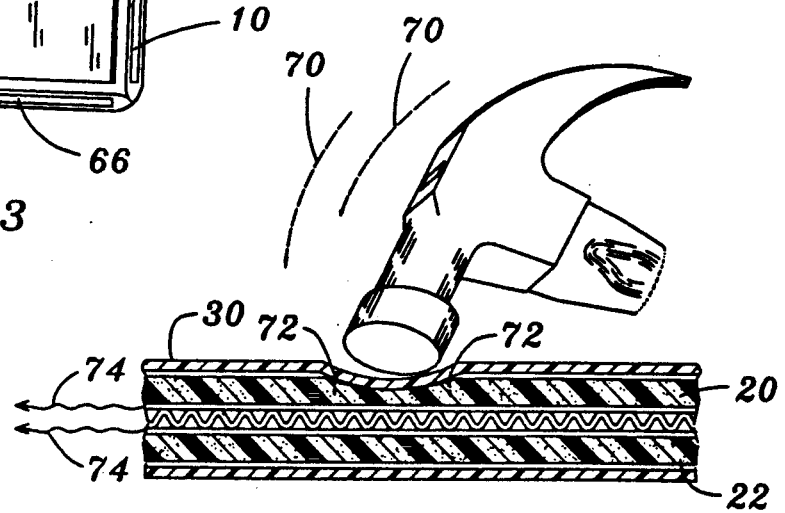
FIG. 4 is a perspective view taken in partial section illustrating the direction of travel of shock impact exerted on the shock absorbent structure of the present invention.

Accordingly, any shock exerted on the exterior shell structure 30 of the case, as indicated by the arrows 70, would be substantially absorbed by the outer impact pad 20. Any excessive shock, as indicated by the arrows 72, would thereafter be dispersed and redirected by the central impact shield 12 in a direction indicated by the arrows 74, as shown in FIG. 4. Additionally, any shock transmitted through the centrally disposed impact shield 12 would thereafter be absorbed by the inner impact pad 22, thereby preventing damage to the contents being carried within the carrying case 60.

Now that the invention has been described, what is claimed is:

1. A shock absorbing barrier for use in the wall construction of a carrying case comprising:
    a centrally disposed impact shield formed of a rigid, impact resistant thermoplastic material and including an upper layer and a lower layer positioned and disposed in spaced apart parallel relation and having an interior core connecting between said upper layer and said lower layer with a plurality of hollow channels extending therethrough,
    said interior core including a plurality of elongate core segments, being integrally formed of said rigid, impact resistant, thermoplastic material, extending longitudinally between said upper and lower layers and connecting thereto along opposite side edges so as to maintain said upper and lower layers in substantially close, spaced relation to one another wherein each one of said plurality of hollow channels extends longitudinally between two adjacently positioned core segments,
    said impact shield positioned in sandwiched relation between a pair of impact pads including a first impact pad disposed in adjacent, covering relation to an outer surface of said upper layer and a second impact pad disposed in adjacent covering relation to said lower layer,
    said impact pads being formed of a resilient, high impact shock absorbent material, and
    a cover formed of a flexible, durable material and disposed in covering relation to said impact pads, said cover forming an inner and outer shell of the carrying case.

2. A shock absorbent barrier as in claim 1 wherein said impact shield is formed of a substantially rigid, thermoplastic insulative material, which by its nature prevents transfer of heat therethrough.

3. A shock absorbent barrier as in claim 1 wherein said upper layer and said lower layer are each formed of a substantially planar sheet of thermoplastic insulative material, said upper and lower layers positioned and disposed in spaced apart, parallel relation with said plurality of core segments and said plurality of hollow channels extending longitudinally therebetween.

4. A shock absorbent barrier as in claim 3 wherein said plurality of core segments are positioned so as to extend between said upper and said lower layers at an angle with each individual one of said plurality of core segments meeting with an adjacently positioned core segment along said opposite side edges to form upper and lower apexes defining a continuous corrugated interior wall.

5. A shock absorbent barrier as in claim 1 wherein said plurality of core segments are positioned and disposed so as to extend longitudinally between said upper and said lower layers in substantially upright parallel relation to one another with said plurality of hollow channels extending longitudinally therebetween.

6. A shock absorbent barrier as in claim 2 wherein said interior core comprises a continuous one piece corrugated wall having upper and lower apexes adjacent to and connecting with said upper and lower layers respectively.

* * * * *